United States Patent
Meseth

(10) Patent No.: US 7,532,699 B2
(45) Date of Patent: May 12, 2009

(54) NUCLEAR FACILITY AND METHOD FOR OPERATING A NUCLEAR FACILITY

(75) Inventor: Johann Meseth, Dieburg (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 11/252,103

(22) Filed: Oct. 17, 2005

(65) Prior Publication Data

US 2006/0251202 A1 Nov. 9, 2006

Related U.S. Application Data

(63) Continuation of application No. PCT/EP2004/004109, filed on Apr. 16, 2004.

(30) Foreign Application Priority Data

Apr. 16, 2003 (DE) ................................. 103 18 081
Apr. 16, 2003 (DE) ................................. 103 18 141

(51) Int. Cl.
*G21C 9/00* (2006.01)
(52) U.S. Cl. ........................ 376/282; 376/283; 376/293
(58) Field of Classification Search ......... 376/282–283, 376/293
See application file for complete search history.

(56) References Cited

U.S. PATENT DOCUMENTS

| | | | | |
|---|---|---|---|---|
| 3,718,539 | A * | 2/1973 | West et al. ................... | 376/283 |
| 4,362,693 | A * | 12/1982 | Bukrinsky et al. .......... | 376/298 |
| 5,087,408 | A * | 2/1992 | Tominaga et al. ........... | 376/283 |
| 5,102,616 | A * | 4/1992 | Gardner et al. .............. | 376/282 |
| 5,126,099 | A * | 6/1992 | Van Kuijk ................... | 376/283 |
| 5,272,737 | A * | 12/1993 | Fujii et al. ................... | 376/283 |
| 5,276,720 | A * | 1/1994 | Oosterkamp et al. ........ | 376/283 |
| 5,309,489 | A * | 5/1994 | Tate et al. .................... | 376/299 |
| 5,345,481 | A * | 9/1994 | Oosterkamp ................ | 376/293 |
| 5,511,102 | A * | 4/1996 | Gluntz ........................ | 376/283 |
| 6,243,432 | B1 * | 6/2001 | Cheung et al. .............. | 376/283 |
| 2002/0085660 | A1 * | 7/2002 | Nakamaru et al. .......... | 376/283 |

FOREIGN PATENT DOCUMENTS

| | | |
|---|---|---|
| CH | 578 982 | 8/1976 |
| DE | 198 09 000 C1 | 7/1999 |
| EP | 0 476 563 A3 | 3/1992 |

(Continued)

OTHER PUBLICATIONS

Merriam-Webster's Collegiate Dictionary, Tenth Edition, p. 1052.*

*Primary Examiner*—Rick Palabrica
(74) *Attorney, Agent, or Firm*—Laurence A. Greenberg; Werner H. Stemer; Ralph E. Locher

(57) ABSTRACT

A nuclear facility contains a flood tank, which is provided for holding a cooling liquid, a condensation chamber, and an overflow device, which leads from the flood tank to the condensation chamber and which serves to discharge excess cooling liquid. The overflow device is provided for separating gas components out from the excess cooling liquid. In certain operating states, the cooling liquid of the condensation chamber and of the flood tank is circulated in a common cooling circuit and is fed, while being largely free of gas, once more into the condensation chamber via the overflow device.

16 Claims, 1 Drawing Sheet

FOREIGN PATENT DOCUMENTS

| | | |
|---|---|---|
| GB | 563023 | 7/1944 |
| GB | 2 067 891 A | 8/1981 |
| JP | 2253195 | 10/1990 |
| JP | 4188095 | 7/1992 |
| JP | 9090083 | 4/1997 |

* cited by examiner

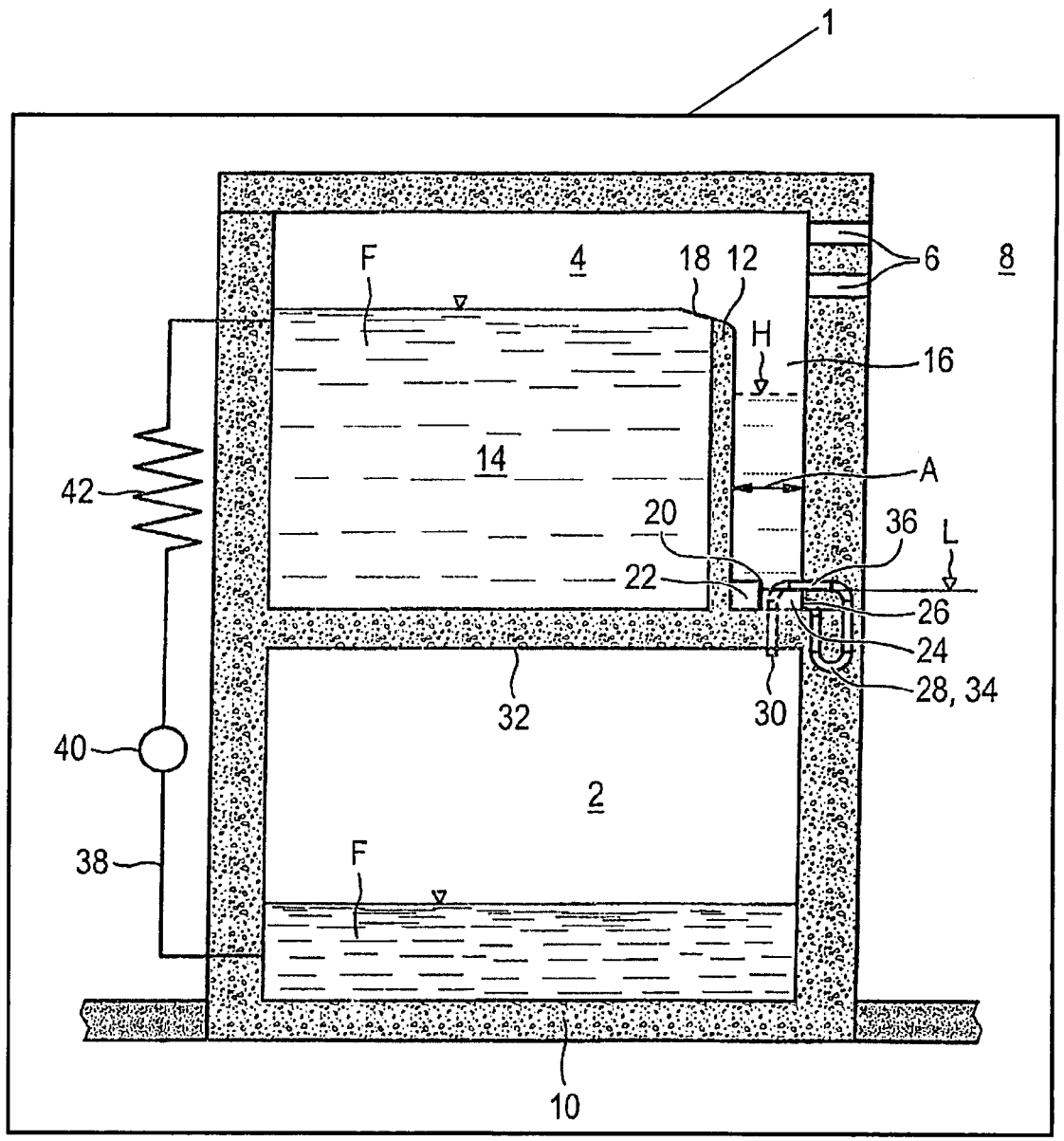

NUCLEAR FACILITY AND METHOD FOR OPERATING A NUCLEAR FACILITY

CROSS-REFERENCE TO RELATED APPLICATION

This is a continuing application, under 35 U.S.C. §120, of copending international application No. PCT/EP2004/004109, filed Apr. 16, 2004, which designated the United States; this application also claims the priority, under 35 U.S.C. §119, of German patent application No. 103 18 141.5, filed Apr. 16, 2003 and German patent application No. 103 18 081.8, filed Apr. 16, 2003; the prior applications are herewith incorporated by reference in their entirety.

BACKGROUND OF THE INVENTION

Field of the Invention

The invention relates to a nuclear facility, in particular a boiling water reactor facility, and to a method for operating the facility.

In a modern boiling water reactor facility, a flood tank is provided as a reservoir for cooling liquid, which is used if required for cooling the reactor. In this case, the flood tank is normally disposed in such a way that the coolant flows to the desired location solely due to gravitational forces and without the use of active components, such as pumps for example. Also provided in the boiling water reactor facility is a condensation chamber, which is an important part of the cooling system of a modern boiling water reactor facility. The cooling system is configured for controlling a loss-of-coolant accident, during which large steam quantities can be released inside the containment structure in the "pressure chamber". The released steam is directed into the condensation chamber for condensing. To this end, for example in the SWR1000 concept of Framatone ANP, a passively acting system is provided, which does not need an external power supply and active components. To be precise, a plurality of condensation pipes are provided which, starting from a certain excess pressure in the pressure chamber, open up a flow path into the condensation chamber and thus enable the steam to be directed into the condensation chamber. For the operability of the cooling system, it is therefore necessary for an excess pressure to build up in the pressure chamber. In other words, the condensation chamber must be closed off in a gas-tight manner from the pressure chamber, so that the introduction of steam via the condensation pipe is reliably ensured.

During normal operation, heat is supplied to the coolant in the flood tank, so that the coolant has to be cooled at regular time intervals. A separate cooling circuit is normally provided for this purpose.

SUMMARY OF THE INVENTION

It is accordingly an object of the invention to provide a nuclear facility and a method for operating the nuclear facility that overcome the above-mentioned disadvantages of the prior art devices and methods of this general type, which ensures a reliable operation of the nuclear facility.

With the foregoing and other objects in view there is provided, in accordance with the invention, a nuclear facility. The nuclear facility contains a flood tank for receiving a cooling liquid, a condensation chamber, and an overflow circuit connecting the flood tank to the condensation chamber and intended for excess amounts of the cooling liquid.

The object is achieved according to the invention by a nuclear facility, in particular a boiling water reactor facility, which has a flood tank provided for the cooling liquid, the condensation chamber and the overflow circuit disposed from the flood tank to the condensation chamber and intended for excess cooling liquid.

The configuration is based on the idea of introducing cold water for cooling the cooling liquid in the flood tank and of at the same time dispensing with a separate cooling circuit for the cooling liquid of the flood tank. The excess, hot cooling liquid is fed to the condensation chamber via the overflow circuit. This measure makes it unnecessary to dispose a separate cooling circuit for the cooling liquid of the flood tank. To cool the cooling water, recourse may be had to a cooling circuit for the condensation chamber. Little outlay is required in terms of equipment, the requisite installation space is kept small and thus the requisite costs are kept low. In addition, it is not necessary to regulate the level in the flood tank.

During the transfer of the cooling liquid from the flood tank into the condensation chamber, there is the risk of gas particles being entrained from the flood tank into the condensation chamber. The flood tank is normally connected to the pressure chamber, i.e. the same pressure conditions prevail in the flood tank and in the pressure chamber. Entrainment of gas particles into the condensation chamber would in this case lead to the pressure in the condensation chamber increasing. This is disadvantageous with regard to the operability of the cooling system. In a preferred development, provision is therefore made for the overflow circuit to be configured for separating the gas from the liquid. An undesirable pressure increase in the condensation chamber is therefore reliably avoided.

The flood tank expediently contains a storage tank and a separation shaft that are separated by a dividing wall that permits an overflow. Furthermore, an overflow line is provided, the orifice opening of which is disposed in the bottom region of the separation shaft.

The cooling liquid of the flood tank is kept in the storage tank. During the feeding of cooling liquid, the liquid level rises until the cooling liquid overflows over the dividing wall into the separation shaft and collects there. Since the cooling liquid is drawn off via the orifice opening, which is preferably disposed in the direct vicinity of the base or directly in the base, the risk of the gas entrainment is reduced. This is because any gas particles possibly present—before they pass into the overflow line—rise and escape from the cooling liquid.

In an expedient configuration, the overflow circuit is configured for a maximum overflow mass flow in such a way that, when the maximum overflow mass flow occurs, the overflow line has a predetermined flow resistance, so that banking-up of the liquid occurs in the separation shaft up to a maximum banking-up level.

This configuration is based on the idea of setting the flow resistance of the overflow line, for example by selecting the flow cross section, in such a way that predetermined banking-up occurs in the separation shaft, so that the cooling liquid, before it is directed via the overflow line into the condensation chamber, dwells for a sufficiently long period in the separation shaft so that gas particles present in the cooling liquid can be emitted from the cooling liquid.

The flow cross-sectional area of the separation shaft is preferably configured in such a way that the dropping speed of the banked-up cooling liquid is less than the rising speed of gas bubbles of predetermined size. The expression "dropping speed" in this case refers to the average dropping speed. In the event of a constant mass flow in the steady case, the quantity of cooling liquid fed to the separation shaft and the quantity of cooling liquid drawn off therefrom are identical. The dropping speed of the banked-up liquid, that is to say the average speed, with which a liquid volume moves in the direction of the orifice opening, is in this case determined substantially by the flow cross-sectional area of the separation shaft. On the other hand, the rising speed, brought about by the buoyancy force, of the gas bubbles depends to a considerable extent on their size (diameter). Due to the dropping speed being specifically set to be lower than the rising speed of the gas bubbles, the latter rise more quickly than the cooling liquid sinks, so that the gas bubbles do not reach the first orifice opening of the overflow line.

In an expedient development, the overflow circuit is configured in such a way that, even if a mass flow is absent, that is to say during zero throughput, the cooling liquid is present in the separation shaft up to a minimum banking-up level. The configuration is based on the consideration that, when the feeding of cold cooling liquid into the flood tank is started or stopped, unsteady phases occur during which the banked-up liquid mass increases from zero throughput to maximum mass flow or drops back again to the zero throughput. During these unsteady phases, the cooling liquid in the separation shaft must first be collected up to the maximum banking-up level and reduced again in order to achieve the full mass throughput. During these unsteady phases, the cooling liquid plunges over the large height of fall into the separation shaft and there is the risk of considerable gas quantities being entrained, and these gas quantities, in the absence of banking-up, could possibly pass directly into the overflow line and thus into the condensation chamber. This risk is reduced by ensuring a minimum banking-up level in the separation shaft.

To set the minimum banking-up level, the overflow line is expediently configured like a siphon having a top siphon bend, the minimum banking-up level being determined by said top siphon bend.

According to a preferred development, the separation shaft, in its base region, contains a separation chamber and an outflow chamber which are separated by a further dividing wall which permits an overflow. The orifice opening of the overflow line is in this case disposed in the outflow chamber. First, the cooling liquid plunging into the separation shaft is collected in the separation chamber, so that it can calm down there and possibly the gas bubbles can already escape. From the separation chamber, the cooling liquid then runs with only slight turbulence and largely in a gas-free manner into the outflow chamber, so that gas transfer into the condensation chamber is avoided even during the unsteady phases.

A common cooling circuit that contains the overflow circuit is preferably provided for the cooling liquid of the flood tank and the cooling liquid of the condensation chamber. Here, the common cooling circuit is formed in particular by a pump line, a pump and a heat exchanger. The pump line leads from the condensation chamber to the flood tank, so that, by the circulating principle, the cooling liquid is recirculated from the condensation chamber into the flood tank and from there back into the condensation chamber. Excess heat is dissipated via the heat exchanger provided in the common cooling circuit. The common cooling circuit both for the cooling liquid of the flood tank and for that of the condensation chamber dispenses with the need for two separate cooling circuits. The requisite installation space is thus kept small and the costs are therefore kept low.

The object is also achieved according to the invention by a method for operating a nuclear facility, in particular a boiling water reactor facility. The advantages and preferred embodiments specified with the regard to the facility can also be analogously applied to the method.

Other features which are considered as characteristic for the invention are set forth in the appended claims.

Although the invention is illustrated and described herein as embodied in a nuclear facility and a method for operating a nuclear facility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE DRAWING

The single FIGURE of the drawing is an illustration of an exemplary embodiment of a containment structure of a boiling water reactor facility according to the invention.

DESCRIPTION OF THE PREFERRED EMBODIMENTS

Referring now to the single FIGURE of the drawing in detail, there is shown a boiling water reactor 1 having a containment structure formed of a condensation chamber 2 and a flood tank 4 disposed above the condensation chamber 2. The flood tank 4 and the condensation chamber 2 are preferably disposed together in an interior of the containment structure. The flood tank 4 is connected via an open connection 6 to the interior space, designated as pressure chamber 8, of the containment structure, so that a gas exchange and thus a pressure equalization can take place between the pressure chamber 8 and the flood tank 4. The condensation chamber 2 and the flood tank 4 are separated from one another by a concrete wall structure 10, the condensation chamber 2 being sealed off in a gas-tight manner relative to the flood tank 4 and the pressure chamber 8 during normal operation of the facility. The flood tank 4 and the condensation chamber 2 are part of a cooling system, which also contains a non-illustrated condensation pipe. The cooling system is also configured for controlling a loss-of-coolant accident, during which large steam quantities may arise in the pressure chamber 8, the steam quantities being directed via the condensation pipe into the cooling liquid F of the condensation chamber 2.

The flood tank 4 is subdivided by a dividing wall 12 into a storage tank 14 and a separation shaft 16. The cooling liquid F provided for the emergency cooling is kept in the storage tank 4. An overflow edge 18 is located at the top end of the first dividing wall 12. An overflow edge 18 is of sloping construction in order to ensure as far as possible turbulence-free overflow of the cooling liquid F. Disposed at the base of the separation shaft 16 is a second dividing wall 20, which subdivides the base region into a separation chamber 22, adjoining the first dividing wall 12, and an outflow chamber 24. A first orifice opening 26 of an overflow line 28 is disposed in the base region of the outflow chamber 24. A second orifice opening 30 of the overflow line 28 is disposed in the top region of the condensation chamber 2 and in particular directly on or in its ceiling 32. The overflow line 28 is configured like a siphon with a bottom siphon bend 34 and a top siphon bend 36. The overflow line 28 is preferably a simple pipeline without further built-in components and runs in particular virtually completely in the wall structure 10. The flow path formed by the overflow line 28 therefore remains serviceable even in the event of a damaged pipeline. The separation shaft 16, with the overflow edge 18 of the separation chamber 22 and the outflow chamber 24, and the overflow line 28 form an overflow circuit for excess cooling liquid F.

The overflow circuit is part of a common cooling circuit for the cooling liquid F located in the flood tank 4 and in the condensation chamber 2. In addition to the overflow circuit, the common cooling circuit has a pump line 38, a pump 40 and a heat exchanger 42, it being possible for cooling liquid F to be pumped via the pump line 38 from the condensation chamber 2 into the flood tank 4 via the heat exchanger 40. The provision of a common cooling circuit dispenses with the need for the configuration of a plurality of separate cooling circuits. As a result, the installation costs can be kept low and the requisite construction space can be kept small.

Cooling of the cooling liquid F in the flood tank 4 is necessary from time to time on account of an input of heat during normal operation of the facility. To this end, the cooling liquid F is pumped from the condensation chamber 2 via the common cooling circuit through the heat exchanger 42, is cooled in the process and is then directed into the storage tank 14. If the filling level in the storage tank 14 exceeds the maximum filling level defined by the overflow edge 18, the excess cooling liquid F flows over the overflow edge 18 into the separation shaft 16 and from there via the overflow line 28 back into the condensation chamber 2.

During the recirculation of the cooling liquid F into the condensation chamber 2, the introduction of gas particles is to be avoided, since otherwise an undesirable pressure increase in the condensation chamber 2, combined with a corresponding pressure drop in the pressure chamber 8, would be affected. The overflow circuit is therefore configured for separating gas particles that are located in the excess cooling liquid F. In this case, the gas separation is ensured in particular by the special construction of the separation shaft 16. Two-stage gas separation is provided here by the two dividing walls 12, 20, the second stage formed by the second dividing wall 20 being effective in particular during small mass flows. The operating principle of the gas separation is now described.

At the start of the circulation of the cooling liquid F, the mass flow of the excess cooling liquid F, which passes into the separation shaft 16, increases continuously during the unsteady phase until a maximum mass flow is reached and a steady phase forms. During the steady phase, the mass flow of cooling liquid F fed to the separation shaft 16 and the mass flow of cooling liquid F drawn off therefrom are identical. The flow resistance of the overflow line 28 is set to a certain value for this maximum mass flow, so that the cooling liquid F is banked up (stored, backed-up) in the separation shaft up a maximum banking-up level H. The maximum banking-up level H is, for example, several meters and lies at about ⅔ of the height of the first dividing wall 12 or of the overflow edge 18.

After the pump 40 has been switched off, the mass flow decreases again until finally excess cooling liquid F no longer passes into the separation shaft 16 (zero throughput). The level of the banked-up cooling liquid F drops continuously until a minimum banking-up level L is achieved in the separation shaft 16. The minimum banking-up level L is defined by the height of the top siphon bend 36. Occurring slightly above it in the separation chamber 22 is a somewhat higher filling level, since the second dividing wall 20 has a height above the minimum filling level L. The minimum banking-up level L is, for example, 0.5 m.

During the steady phase with the maximum mass flow, an average dropping speed of the banked-up cooling liquid F occurs. The dropping speed is a measure of the speed with which an imaginary liquid volume in the separation shaft 16 passes in the direction of the overflow line 28. In the steady case, the dropping speed is determined to a considerable extent by the flow cross-sectional area A of the separation shaft 16. Gas particles entrained during the overflow into the separation shaft 16 form gas bubbles in the cooling liquid F, and these gas bubbles rise upward in the banked-up liquid at a rising speed resulting from the buoyancy force. The dropping speed and the rising speed are thus directed in opposition. The rising speed depends on the size of the gas bubbles. The flow cross-sectional area A of the separation shaft is now set, for example, to several square meters in such a way that the rising speed of gas bubbles of a predetermined size, for example of a diameter of 1 mm, is greater than the dropping speed. This ensures that the gas bubbles rise more quickly than cooling liquid F passes to the overflow line 28.

As the small mass flows during the unsteady phase, there is the problem that, on account of the larger height of fall from the overflow edge 18 down to the now low level of the banked-up cooling liquid F, the input of gas and the turbulence in the cooling liquid F in the separation shaft 16 are greater than during the steady phase. Therefore the second stage of the gas separation is provided, the second stage being substantially formed from the separation chamber 22 and the outflow chamber 24. First, the cooling liquid F plunging down over the overflow edge 18 is trapped and collected in the separation chamber 22 until it flows over the second dividing wall 20 largely free of turbulence. A large part of the gas separation thus already takes place in the separation chamber 22. During the overflow over the second dividing wall 20, only small proportions of gas are entrained. The decisive factor in this respect is that the height of the second dividing wall 20 and the minimum banking-up level L in the outflow chamber 24 have only slight differences of, for example, a few centimeters, so that greater turbulence cannot be generated in the outflow chamber 24 and no input of gas takes place. The largely gas-free cooling liquid F then flows over from the outflow chamber 24 via the overflow line 28 into the condensation chamber 2.

Due to the configuration of the series alignment of the first and second dividing walls 12, 20, having a very large height of several meters and respectively a very small height of less than 1 m, in combination with the special dimensioning of the separation shaft 16 and the overflow line 28, effective gas separation is brought about without the need for active components susceptible to faults, such as, for example, rotating parts or parts driven by external power. The gas separation is therefore effected purely passively and is not susceptible to faults.

I claim:

1. A nuclear facility with a reactor, comprising:
   a pressure chamber;
   a flood tank being a reservoir for storing a cooling liquid for emergency cooling of the reactor;
   a condensation chamber sealed off in a gas-tight manner relative to said pressure chamber and said flood tank, and said condensation chamber being configured for receiving and condensing steam released in said pressure chamber during a loss-of-coolant accident;
   an overflow circuit connecting said flood tank to said condensation chamber and intended for excess amounts of the cooling liquid, said overflow circuit including an overflow line being a siphon having a bottom siphon bend; and a common cooling circuit including said overflow circuit being provided for the cooling liquid of said flood tank and the cooling liquid of said condensation chamber.

2. The facility according to claim 1, wherein said overflow circuit separates gases from the cooling liquid.

3. The facility according to claim 1, wherein:
said flood tank includes a dividing wall, a storage tank and a separation shaft separated from said storage tank by said dividing wall, said dividing wall permitting an overflow of the cooling liquid; and
said overflow line has an orifice opening formed therein disposed in a bottom region of said separation shaft.

4. The facility according to claim 3, wherein said orifice opening is disposed in a base of said separation shaft or in a direct vicinity of said base.

5. The facility according to claim 3, wherein said overflow circuit is configured for an overflow mass flow, when the overflow mass flow occurs, said overflow line has a given flow resistance, so that banking-up of the cooling liquid occurs in said separation shaft up to a banking-up level.

6. The facility according to claim 5, wherein said separation shaft has a flow cross-sectional area where a dropping speed of banked-up cooling liquid is less than a rising speed of gas bubbles of a given size.

7. The facility according to claim 3, wherein said overflow circuit is configured where even if a mass flow is absent, the cooling liquid is present in said separation shaft up to a given banking-up level.

8. The facility according to claim 7, wherein said overflow line has a top siphon bend, and the given banking-up level is determined by said top siphon bend.

9. The facility according to claim 3, wherein said separation shaft has a base region with a separation chamber, a further dividing wall, and an outflow chamber separated from said separation chamber by said further dividing wall which permits an overflow, said orifice opening of said overflow line is disposed in said outflow chamber.

10. The facility according to claim 1, wherein the nuclear facility is a boiling water reactor facility.

11. A method for operating a nuclear facility, which comprises the steps of:
providing a nuclear facility according to claim 1;
feeding a quantity of cooling liquid exceeding a capacity of the flood tank to the latter in predetermined operating states; and
transferring an excess amount of the cooling liquid through the overflow circuit into the condensation chamber.

12. The method according to claim 11, which further comprises separating gas particles from the excess amount of the cooling liquid.

13. The method according to claim 11, which further comprises conducting the cooling liquid of the flood tank and that of the condensation chamber in the common cooling circuit which includes the overflow circuit.

14. The method according to claim 11, which further comprises operating a boiling water reactor facility.

15. The facility according to claim 1, wherein said cooling circuit includes a line, a pump, and a heat exchanger connected between said condensation chamber and said flood tank configured for communicating the cooling liquid from said condensation chamber to said flood tank.

16. A nuclear facility with a reactor, comprising:
a pressure chamber;
a flood tank being a reservoir for storing a cooling liquid for emergency cooling of the reactor, said flood tank including a dividing wall, a storage tank and a separation shaft separated from said storage tank by said dividing wall, said dividing wall configured for permitting an overflow of the cooling liquid;
a condensation chamber sealed off in a gas-tight manner relative to said pressure chamber and said flood tank, and said condensation chamber being configured for receiving and condensing steam released in said pressure chamber during a loss-of-coolant accident;
an overflow circuit connecting said flood tank to said condensation chamber and intended for excess amounts of the cooling liquid, said overflow circuit having an overflow line with an orifice opening formed therein and disposed in a bottom region of said separation shaft;
said separation shaft having a base region with a separation chamber, a further dividing wall, and an outflow chamber separated from said separation chamber by said further dividing wall configured for permitting an overflow, said orifice opening of said overflow line being disposed in said outflow chamber; and
a common cooling circuit including said overflow circuit being provided for the cooling liquid of said flood tank and the cooling liquid of said condensation chamber.

* * * * *